United States Patent
Heier et al.

(12) 
(10) Patent No.: US 6,457,873 B1
(45) Date of Patent: Oct. 1, 2002

(54) POSITIONING SYSTEM FOR POSITIONING AND ATTACHING OPTICAL FIBRES AND CONNECTORS PROVIDED WITH THIS POSITIONING SYSTEM

(75) Inventors: Andreas Heier, Rheineck; Kurt Ruess, St. Gallen, both of (CH)

(73) Assignee: Huber & Suhner AG, Herisau (CH)

( * ) Notice: Subject to any disclaimer, the term of this patent is extended or adjusted under 35 U.S.C. 154(b) by 0 days.

(21) Appl. No.: 09/622,809

(22) PCT Filed: Feb. 16, 1999

(86) PCT No.: PCT/CH99/00073
§ 371 (c)(1),
(2), (4) Date: Mar. 5, 2001

(87) PCT Pub. No.: WO99/42876
PCT Pub. Date: Aug. 26, 1999

(30) Foreign Application Priority Data

Feb. 23, 1998 (CH) .................................................. 427/98

(51) Int. Cl.[7] .............................................. G02B 6/38
(52) U.S. Cl. .......................................... 385/70; 385/98
(58) Field of Search .............................. 385/98, 99, 65, 385/83, 70

(56) References Cited

U.S. PATENT DOCUMENTS

| | | | | |
|---|---|---|---|---|
| 4,662,962 A | * | 5/1987 | Malavieille | 156/158 |
| 4,730,892 A | * | 3/1988 | Anderson et al. | 385/70 |
| 4,756,591 A | | 7/1988 | Fischer et al. | 350/96.2 |
| 4,802,727 A | | 2/1989 | Stanley | 350/96.2 |
| 4,973,126 A | | 11/1990 | Degami et al. | 350/96.21 |
| 5,351,331 A | * | 9/1994 | Chun et al. | 385/97 |
| 5,377,289 A | | 12/1994 | Johnson et al. | 385/65 |
| 5,400,426 A | * | 3/1995 | Jong et al. | 385/95 |
| 5,692,089 A | * | 11/1997 | Sellers | 385/137 |
| 5,961,849 A | * | 10/1999 | Bostock et al. | 216/24 |
| 5,974,214 A | * | 10/1999 | Shacklette et al. | 385/50 |

FOREIGN PATENT DOCUMENTS

| | | |
|---|---|---|
| EP | 090723 | 10/1983 |
| EP | 0 421 071 A1 | 4/1991 |
| GB | 2 084 944 A | 4/1982 |
| WO | WO 96/23238 | 8/1996 |

OTHER PUBLICATIONS

Kurt E. Petersen, "Silicon as a Mechanical Material", Proceedings of the IEEE, vol. 70, No. 5, May 1982, pp. 420–457.

C. Strandman and Y. Backlund, "Bulk Silicon Holding Structures for Mounting of Optical Fibers in V–Grooves," J. of Micromechanical Systems, vol. 6, No. 1, Mar. 1997, pp. 35–40.

* cited by examiner

Primary Examiner—Brian Sircus
Assistant Examiner—Brian S. Webb
(74) Attorney, Agent, or Firm—Morgan, Lewis & Bockius LLP

(57) ABSTRACT

The present invention relates to a positioning system for automatically positioning and attaching at least one optical fiber inserted into said positioning system along a predetermined optical axis. This positioning system comprises a base member with a flat upper surface and a V-shaped reception channel which is parallel to the upper surface and is formed therein for receiving at least one optical fiber. This system also includes a spring-effect retaining member which is mounted on the upper surface of the base member for maintaining the at least one optical fiber inserted into the reception channel. This invention provides for a simple structure, as well as, for a precise and mechanically resistant coupling since the retaining member comprises a membrane which is parallel to the upper surface of the base member, which is mounted above the reception channel and which can be resiliently diverted in a direction perpendicular to the upper surface of said base member. When the at least one optical fiber is inserted into the reception channel, the membrane is diverted so as to fix said optical fiber in the reception channel due to the restoring force of the membrane.

23 Claims, 3 Drawing Sheets

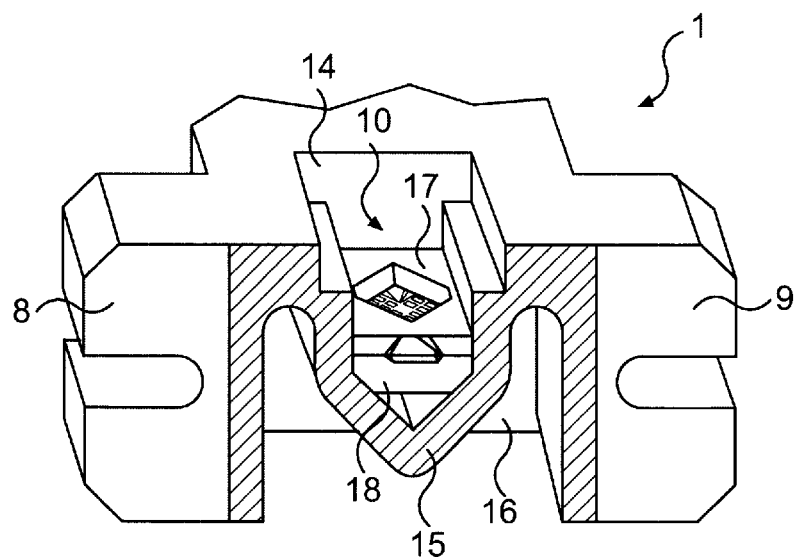
FIG. 2
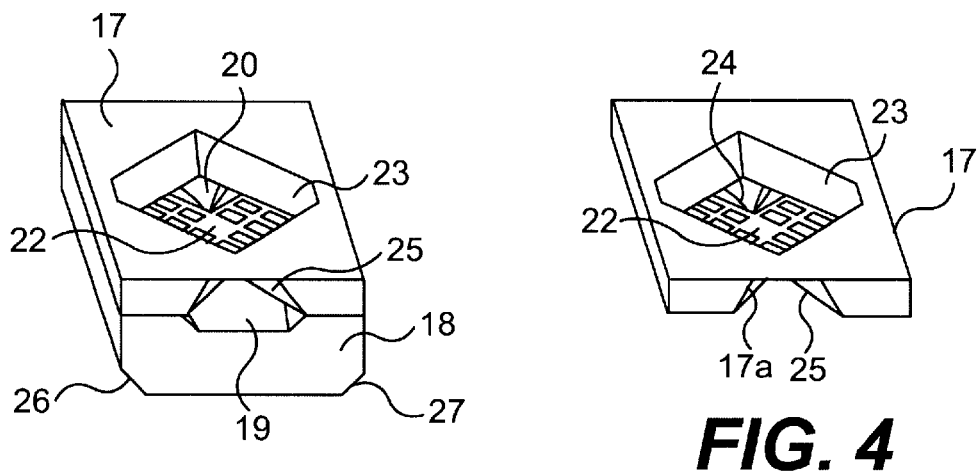
FIG. 3  FIG. 4
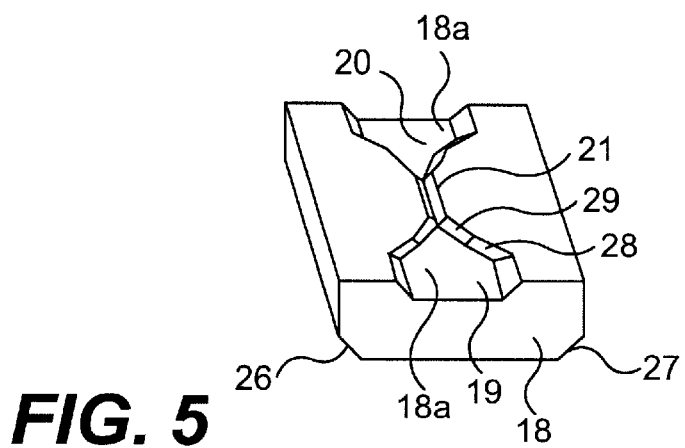
FIG. 5

POSITIONING SYSTEM FOR POSITIONING AND ATTACHING OPTICAL FIBRES AND CONNECTORS PROVIDED WITH THIS POSITIONING SYSTEM

TECHNICAL FIELD

The present invention relates to the field of optical fiber coupling technology. It relates to a positioning system for automatically positioning and attaching at least one optical fiber inserted into said positioning system along a predetermined optical axis 2, said positioning system comprising a base member with a flat upper surface and a V-shaped receiving channel which is parallel to said upper surface and is formed therein for receiving at least one optical fiber; said system also includes a separate spring-action retaining member which is arranged on the upper surface of the base member for securing the minimum of one optical fiber inserted into the receiving channel.

Such a positioning system is know, for example, from U.S. Pat. No. application No. 4,973,126 A.

STATE OF THE ART

With the increasing widespread use of optical fibers, which have become popular because of their high transmission capacity and their lack of sensitivity to interference fields, there has also been an increasing demand for connectors that make it possible to optically couple two optical fibers detachably and with the lowest possible attenuation or to connect an optical fiber to a transmission or receiving element. It is self-evident that a very high precision (less than 1 $\mu$m) is necessary in positioning and coupling the fibers in optical coupling in order to obtain low values for insertion damping (e.g., less than 0.5 dB) and high values for reflux damping (e.g., g reater than 60 dB) because of the small diameter of the fibers (for example, fiber diameter 125 $\mu$m) and because of the even smaller mode field diameter (for example, approx. 10 $\mu$m with a monomode fiber). At the same time, the coupling device should be mechanically sturdy, reliable in functioning even with repeated connection operations, easy to handle and inexpensive to manufacture in large numbers.

Traditional connectors for optical fibers such as those available commercially by the present applicant under the brand name Optoclip ll use a precision mechanical centering element, whereby for positioning and centering the fibers to be inserted, said fibers are passed through the center of a group of three beads arranged in an equilateral triangle, thereby pre-centering them. A pair of closely spaced cylinders aligned parallel with one another and with the optical axis are provided in the interior of the element for precision centering and securing so that the two fiber ends to be coupled come to lie between the cylinders and are secured in position by spring-action balls sitting above them. Such a traditional connector is complicated to manufacture and assemble and is also relatively sensitive mechanically.

Therefore, there have already been various proposals for producing positioning and centering elements and systems for coupling optical fibers using the relatively new micromechanics based on silicon technology so that these elements would be relatively simple to manufacture by wellknown technologies, would be mechanically sturdy and would be characterized by a high precision. Various proposals use bodies made of a single-crystal silicon with a predetermined crystal orientation for receiving and supporting the optical fibers, where a V-shaped groove or channel running in the direction of the optical axis is produced in these monocrystalline bodies by wet chemical etching or by comparable processing operations. The ends of the optical fibers to be coupled are then inserted into or placed in this V-shaped receiving channel and are centered in the channel and secured there by a traditional mechanical device pressing on the body with a spring-action from above. A typical solution of this type is disclosed in the above-mentioned publication U.S. patent application Ser. No. 4,973,126 A, where a silicon plate mounted in a plastic block accommodates the two fiber ends in a V-groove. The spring-action pressing device here consists of a cover plate made of glass and a spring clip which is pushed over the entire arrangement at the side and presses the cover plate against the silicon plate. This known solution ha s the disadvantage in particular that it is not suitable for a connector, but instead must be carefully assembled from the various individual parts for each coupling operation. A comparable solution for coupling an optical fiber to an active optical element can be found, for example, in U.S. patent application Ser. No. 4,756,591 A or U.S. Pat. No. 4,802,727 A.

A more extensive micromechanical solution for a connector for optical fibers is known from U.S. patent application Ser. No. 5,377,289 A, where positioning devices produced entirely by micromechanical processing of silicon and each comprising two arms are used for centering and securing the inserted optical fibers. The arms are each provided with a V-groove and are arranged one above the other in such a way that the V-grooves are opposite one another and form a receiving channel for the fibers. At one end, the channel is conically enlarged by selective directional etching, thus facilitating insertion of the fibers. At the other end, the channel is tapered. At the same time, the arms there can also be bent outward, so that a fiber inserted into the channel causes the arms to bend outward while at the same time being clamped between the arms and centered there by means of the restoring forces. However, the complete connector consists of a plurality of small individual parts to be assembled in a precision manner, so that assembly is especially difficult and complicated.

Other solutions where spring-action tongues projecting over the groove at the side are used to secure the optical fibers in the V-groove of the Si receiving plate, said tongues being produced by applying a suitable layer to the surface of the silicon receiving plate and then etching it away selectively, are known from European Patent Application No. 805,994 A1, for example, or from the article by C. Strandman and Y. Backlund, "Bulk Silicon Holding Structures for Mounting of Optical Fibers in V-Grooves," *J. of Micromechanical Systems*, Vol. 6, No. 1, March 1997 pages 35–40. With these solutions, the tongues have a relatively great mechanical susceptibility to breakage. On the other hand, the entire device is produced in a continuous and very complicated sequence of process steps, which limits the yield and makes production complicated and expensive.

EXPLANATION OF THE INVENTION

Therefore, the object of this invention is to create a positioning device for optical fibers that has a simple design and is easy to manufacture, easy to assemble, has a high precision, is mechanically sturdy and can be produced reliably and inexpensively by a micromechanical processing operation which involves a relatively small number of steps.

This object is achieved with a positioning device of the type mentioned in the preamble by the fact that the retaining member comprises a membrane which is elastically deflectable at a right angle and is arranged parallel to the upper side of the base member above the receiving channel and perpendicular to the upper side of the base member, said membrane being deflected when the minimum of one optical fiber is inserted into the receiving channel, and with its restoring force it secures the minimum of one optical fiber in the receiving channel. Using the membrane according to this invention yields a mechanically very stable and compact design of the device whose individual parts can be manufactured and assembled very easily. In particular, the membrane retaining member is suitable for production by micromechanical methods.

To facilitate insertion of the optical fibers into the receiving channel, according to a first preferred embodiment of the device according to this invention, a centering area which tapers from the outside to the inside toward the end of the receiving channel is provided in the base member on at least one end of the receiving channel, said centering area causing the proper alignment of the minimum of one optical fiber with the end of the receiving channel when the optical fiber is inserted into the positioning device.

The positioning device according to this invention can be used for coupling an optical fiber to an active optical element such as a laser diode or the like. However, this device can also be used in particular for coupling two optical fibers when they are inserted from two opposite directions into the positioning device according to a second preferred embodiment for positioning and securing optical fibers that abut against one another end to end, and the centering area is provided at both ends of the receiving channel.

Centering of the optical fibers inserted can be further improved if, according to another preferred embodiment, the centering area(s) of the base member is/are divided into a pre-centering area and a precision centering area arranged between the pre-centering area and the respective end of the receiving channel. The pre-centering area narrows the clearance for the inserted fiber end to the smaller area, while the actual centering with the inlet of the receiving channel is accomplished through the precision centering area.

The base member is preferably designed as a solid plate of a single-crystal material, in particular silicon, and the V-shaped receiving channel and optionally also the centering areas and pre-centering and precision centering areas within the base member are produced by micromechanical processing, especially by etching the channel in the solid plate. In this way, a sturdy and high-precision base member is made available by using standard methods.

If the positioning device according to this invention is provided for detachable insertion of optical fibers, it is advantageous because of the mechanical burden due to the inserted fiber ends if, according to another embodiment, at least the V-shaped receiving channel plus optionally the centering areas and pre-centering areas and precision centering area are protected from mechanical stress by a wear layer, especially $SiO_2$.

Another preferred embodiment of the positioning device according to this invention is characterized in that the membrane is arranged on the lower side of the retaining member, the membrane has at least one passage through it and a trough-shaped recess is provided above the membrane in the retaining member to receive an index matching fluid. A supply of index matching fluid can be kept on hand in the trough-shaped recess so that the fluid surrounds the ends of the optical fibers beneath the membrane through the passage in the membrane. If the fibers are inserted and removed repeatedly, which is the usual practice with a connector, the resulting loss of index matching fluid can be replenished from the reservoir in the trough-shaped recess. This greatly prolongs the service life of such a plug connector.

The retaining member is preferably designed as a solid plate of a monocrystalline material, especially silicon, and the membrane is produced from the solid plate by micromechanical processing, especially by etching within the retaining member. In particular, the retaining member is made of silicon with a (100) orientation, with a centering area for centering the optical fibers on insertion being provided upstream and/or downstream from the membrane in the direction of the optical axis in the retaining member, and the centering areas of the retaining member are each bordered at the side by walls in the [111] crystal plane that had been etched in a selective manner as to direction. The lower side of the membrane and the centering areas are also preferably protected from mechanical stress by a wear layer, especially made of $SiO_2$.

The connector according to this invention for detachably connecting two optical fibers is characterized in that it comprises a positioning system according to this invention for positioning and securing the two optical fibers.

A preferred embodiment of the connector according to this invention is characterized in that the connector comprises a housing with a device for assembly of the positioning system; the assembly device has a perpendicular assembly shaft into which the positioning system is inserted and held by means of an assembly member; said assembly shaft is bordered in the direction of the optical axis by transverse walls having insertion bores; the optical fibers to be joined can be inserted into the assembly shaft or the positioning system at the side through said insertion bores; the assembly shaft is bordered at the lower end by a V-shaped shaft bottom running parallel to the optical axis; the positioning device is inserted into the assembly shaft with the base member facing down, and the positioning device is centered in the assembly shaft by beveled edges adapted to the V-shaped bottom of the shaft on the lower side of the base member. Assembly and centering are facilitated by the assembly shaft, and the positioning device is protected by the assembly shaft. At the same time this yields a largely closed space.

Sealing this space for an index matching fluid is a achieved in particular by the fact that a trough-shaped recess to accommodate an index matching fluid is provided in the positioning device above the membrane in the retaining member, and a gasket, especially in the form of an O-ring, is arranged between the assembly element and the retaining member, surrounding the trough-shaped recess and sealing it at the top.

Additional embodiments are derived from the dependent claims.

BRIEF EXPLANATION OF FIGURES

This invention will be explained in greater detail below on the basis of embodiments in conjunction with the drawings, which show:

FIG. 2: the partially cut-away housing of the connector from FIG. 1 with the positioning device inserted according to a preferred embodiment of this invention;

FIG. 3: an enlarged diagram of the positioning device from FIG. 2 consisting of a lower base member and an upper retaining member;

FIG. 4: the retaining member from FIG. 3 equipped with an elastic membrane;

FIG. 5: the base member from FIG. 3 equipped with a V-shaped receiving channel and centering areas arranged on both sides;

METHODS OF IMPLEMENTING THE INVENTION

Figure 1:
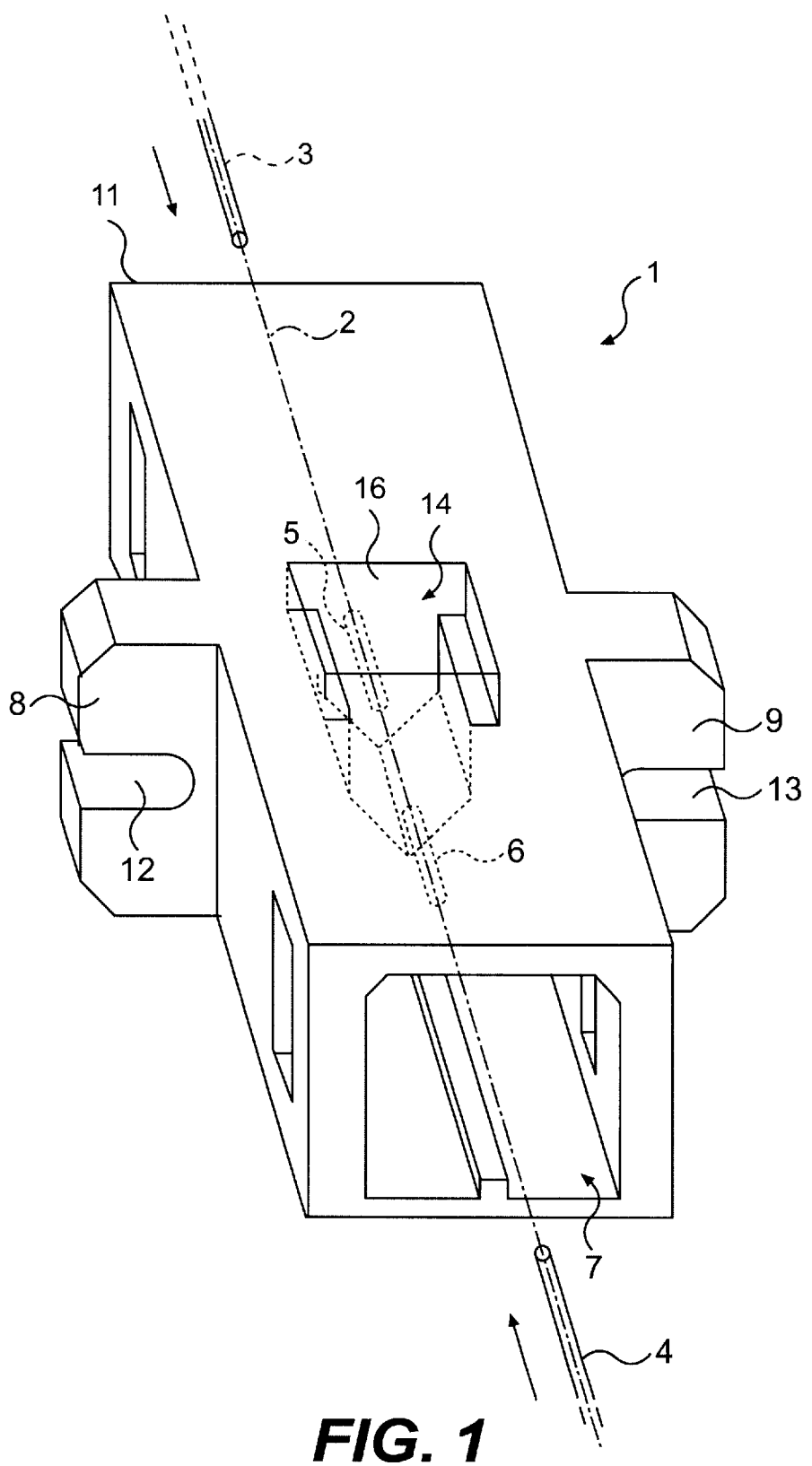
FIG. 1: a perspective view of a releasable connector for two optical fibers with a traditional housing and an assembly shaft to accommodate the positioning device according to this invention.

FIG. 1 shows a perspective view of a releasable connector for two optical fibers for accommodation of the positioning device according to this invention. The connector 1 comprises an elongated housing 11 made of plastic extending along an optical axis 2 and having in the middle area an assembly shaft 14 for accommodating a positioning device, said assembly shaft running perpendicular to the optical axis 2 and extending from above into housing 11. The positioning device itself is not shown in this diagram for the sake of simplicity. Assembly shaft 14 is bordered by the transverse walls 16 in the direction of the optical axis 2 and is separated from the insertion openings 7 arranged on both sides.

Special plugs (not shown) are inserted into the insertion openings 7 from both sides in a known manner on insertion of connector 1 so that they engage, with the ends of the optical fibers 3, 4 which are to be connected being held and protected by retractable sleeves. On insertion of the plugs, the protective sleeves are automatically retracted and the exposed ends of the optical fibers 3, 4 are pushed through appropriate insertion bores 5, 6 in the transverse walls 16 as far as the interior of assembly shaft 14. The housing 11 is equipped with two mounting flanges 8, 9 that project at the side for the purpose of mounting, with a mounting hole 12 or 13 for screw connections or the like being provided in said flange.

The connector 1 is shown in a partially cut-away diagram in FIG. 2 with the positioning device 10 already inserted. The positioning device 10 consists essentially of a lower plate-shaped base member 18 in which the inserted optical fibers are accommodated and secured and a retaining member 17 which is also plate-shaped and lies directly on the former retaining, securing the inserted optical fibers in the base member 18. The base member 18 has two beveled edges (26 and 27 in FIG. 3) running in the direction of the optical axis on its lower side. The bevels match the beveled walls of a V-shaped shaft bottom 15 which seals off the assembly shaft 14 at the bottom, extending in the direction of the optical axis. Through these measures, the positioning device 10 is automatically aligned parallel to the optical axis 2 when inserted into the assembly shaft 14.

The detailed design of the two separate elements 17 and 18 of the positioning device 10 is shown in the enlarged diagram in FIGS. 3, 4 and 5. The retaining member 17 as well as the base member 18 are preferably produced by micromechanical processing methods from monocrystalline plates oriented in (100) direction. A V-shaped receiving channel is produced (by etching) in a known way in the flat upper side of the base member 18 according to FIG. 5 to receive and secure the ends of the two optical fibers 3, 4, with the walls of the receiving channel lying in the [111] planes of the silicon single crystal. The base member 18 has outside dimensions (of the plate) of 4.5×3.2×1 mm (length× width×height), for example, and the V-shaped receiving channel for optical fibers having an outside diameter of 125 μm has, for example, a width of 228 μm, a depth of 162 μm and a length of 1.15 mm.

In order for the optical fibers 3, 4 to be automatically aligned and centered precisely in the positioning device 10 with the two ends or inlets of the receiving channel 21, special centering areas 19 and 20 are produced in the base member 18 (by etching) in front of both ends of the receiving channel 21. Each of the centering 19, 20 is subdivided into a pre-centering area 28 (wider) and a precision centering area 29 (narrower) to improve the centering effect and the uniformity of the centering operation (FIG. 5). The pre-centering area 28 is bordered at the sides by walls in the [133] crystal plane or the [313] crystal plane which have been etched selectively as to direction, while the precision center area 29 is bordered at the sides by walls in the [−133] crystal plane or the [3−13] crystal plane that have been etched in a directionally selective manner. The depth of the centering areas 19, 20 in the above example amounts to 250 μm, the maximum width of the pre-centering area 28 is 1865 μm, and the maximum width of the precision centering area is 665 μm. The conical design of centering areas 19, 20 with the inclined side walls ensures that the ends of optical fibers 3, 4 are automatically centered with the entrances of the receiving channel 21 on insertion. Mechanical damage to the base member 18 due to the fiber ends scraping the surface is prevented or reduced by the fact that the stressed surfaces are coated with wear layer 18a of $SiO_2$.

The retaining member 17 in the present example has dimensions (of the plate) of 4.5 ×3.2 ×0.5 mm (length× width×height). In the assembled state, the retaining member 17 is pressed with its lower side on the upper side of the base member 18 (see FIG. 6). The dimensions of the receiving channel 21 relative to the outside diameter of the optical fibers 3, 4 are selected so that the fibers lying in the receiving channel 21 partially project above the upper plane of the base member 18, so the retaining member 17 presses the fibers into the V-shaped receiving channel 21 and secures them there. In order for this method of securing the fibers to permit insertion and removal of the fibers with no problem and without any mechanical damage, the retaining member 17 has a special design. In the area which comes to lie above the receiving channel 21, a thin membrane 22 is etched out of the silicon plate on the lower side of the retaining member 17, or the plate is etched in this area down to the membrane 22 starting from above (FIGS. 4, 7).

The membrane 22 in the above example has a thickness of 50 μm. It is designed as a perforated membrane and has a plurality of perforations 24 which impart a high flexibility. The membrane 22 has the property of yielding upward elastically when the fibers are inserted into the receiving channel 21, so that the fibers can be inserted into the receiving channel 21 despite their thickness. The restoring force of the deflected membrane 22 secures the fibers reliably in the receiving channel 21 without making it unnecessarily difficult to remove them. The spring path of the membrane 22 in the above example amounts to 8 μm. The membrane 22 is fixedly connected to the solid plate of the retaining member 17 on both sides of the optical axis 2 or the receiving channel 21. In the direction of the axis, however, recesses 34, 35 are provided in membrane 22, limiting the contact area of the membrane to the (short) channel segment so that the fibers can be inserted into the receiving channel 21 without any problem. Centering of the optical fibers with respect to the retaining member 17 is also achieved by the fact that conical centering areas 25, 30 are also provided on the lower side of the retaining member 17 and are bordered at the sides by directionally selectively etched walls in the [111] crystal plane (FIGS. 4, 7). As with the base member 18, the mechanically stressed lower side of the retaining member 17 is preferably coated with a hard wear layer of $SiO_2$.

By etching out membrane 22, a trough-shaped recess 23 (FIGS. 3, 4) is formed in the retaining member 17 above the membrane 22. The index matching fluid for optical matching of the two fiber ends can be stored in this trough-shaped recess 23. The index matching fluid easily penetrates through the perforated membrane 22 to the fiber ends beneath that. If the optical fibers 3, 4 are pulled out of the connector 1, the resulting loss of fluid can easily be replenished from the reservoir in the trough-shaped recess 23 for the next insertion.

Figure 6:
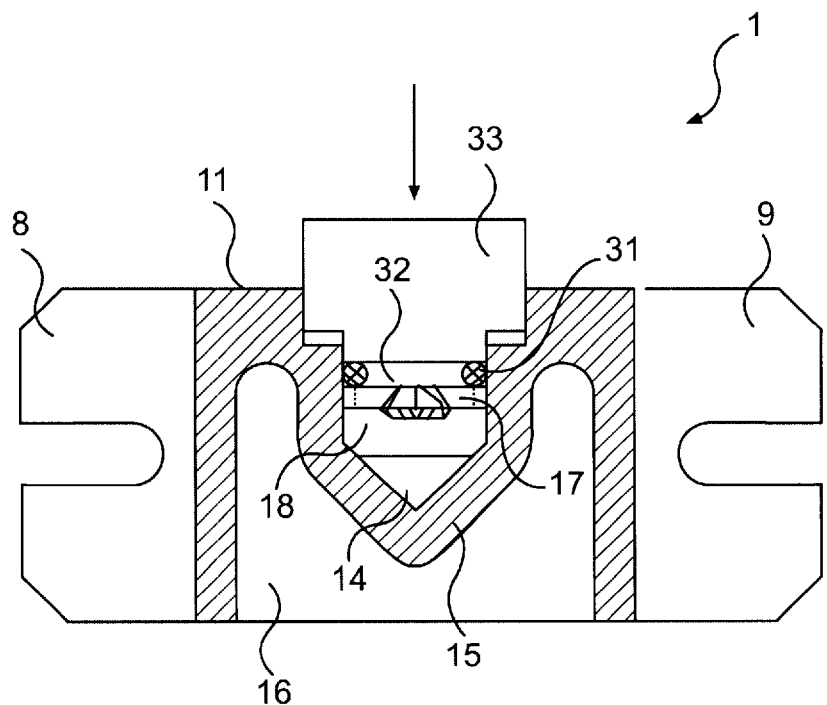
FIG. 6: an axial view of the connector from FIG. 2 with a ram-shaped assembly element and a gasket.
Figure 7:
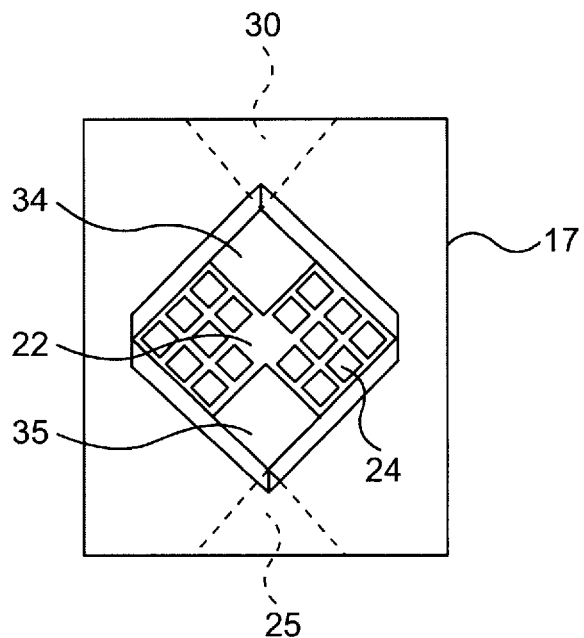
FIG. 7: the retaining member as seen from above.

The position device 10 is secured in the assembly shaft 14 of the plug connector 1 according to FIG. 6 preferably by the fact that a ram-like assembly element 33 is pressed onto the retaining member 17 from above (in the direction of the arrow). The (liquid-filled) trough-shaped recess 23 in the retaining member 17 is sealed by the insertion of a gasket, in particular an O-ring 31, surrounding the recess 23. At the same time, this yields another chamber 32 for the fluid.

On the whole, the present invention yields a positioning device and a connector for optical fibers that can be manufactured easily and with a high precision, are easy to assemble and are characterized by a high precision in use and a great mechanical strength.

What is claimed is:

1. A positioning device for automatically positioning and securing at least one optical fiber inserted into said positioning device along a predetermined optical axis;

said positioning device comprising a base member having a flat upper surface and a V-shaped receiving channel which is parallel to the upper surface and is formed in the upper surface to accommodate at least one optical fiber;

said positioning device having a separate spring-action retaining member which is arranged on the upper surface of the base member for securing the minimum of one optical fiber inserted into the receiving channel;

wherein the retaining member comprises a membrane which is arranged above the receiving channel parallel to the upper surface of the base member and is elastically deflectable perpendicular to the upper surface of the base member;

said retaining member being designed as a solid plate of a monocrystalline material, and said membrane is produced in said retaining member by micromechanical processing;

said membrane being deflected upon insertion of at least one optical fiber into the receiving channel;

said membrane having a restoring force as a result of being deflected;

securing at least one optical fiber in the receiving channel with the restoring force.

2. The positioning device of claim 1, wherein a centering area is provided on at least one end of the receiving channel in the base member, tapering from the outside to the inside toward the end of the receiving channel, so that the at least one optical fiber is aligned with the end of the receiving channel when inserted into the positioning device.

3. The positioning device of claim 1, wherein the centering area of the base member is divided into a pre-centering area and a precision centering area with the precision centering area being between the pre-centering area and a respective end of the receiving channel.

4. The positioning device of claim 1, wherein the base member is designed as a solid plate of a monocrystalline silicon material; and the V-shaped receiving channel, centering areas, pre-centering areas and precision centering areas are formed in the base member.

5. The positioning device according to claim 1, wherein centering areas are provided on both ends of the V-shaped receiving channel;

each of the centering areas are divided into a pre-centering area and precision centering area;

each pre-centering area is arranged between the pre-centering area and the respective end of the receiving channel;

the pre-centering area is bordered at each side by walls etched in a directionally selective manner in a [133] or [313] crystal plane; and the precision centering area is bordered on each side by walls etched in a directionally selective manner in a [–133] or [3–13] crystal plane.

6. The positioning device of claim 1, wherein at least one of the V-shaped receiving channel, centering areas, pre-centering areas and precision centering areas are protected from mechanical stress by a wear layer of $SiO_2$.

7. The positioning device of claim 1, wherein the base element is made of silicon with an orientation in [100] direction, and the V-shaped receiving channel is defamed and bordered by walls etched in a directionally selective manner in [111] crystal planes.

8. The positioning device of claim 1, wherein the V-shaped receiving channel is protected from mechanical stress by a wear layer of $SiO_2$.

9. The positioning device according to 1, wherein centering areas are provided on both ends of the V-shaped receiving channel;

each of the centering areas are divided into a pre-centering area and precision centering area;

each pre-centering area is arranged between the pre-centering area and the respective end of the receiving channel;

the pre-centering area is bordered at each side by walls etched in a directionally selective manner in a [133] or [313] crystal plane.

10. The positioning device of claim 1, wherein at least one of the V-shaped receiving channel, centering areas, pre-centering areas and precision centering areas are protected from mechanical stress by a wear layer of $SiO_2$.

11. The positioning device of claim 1, wherein the positioning device is provided for positioning and securing two optical fibers that are inserted into the positioning device from opposite directions so that the optical fibers abut end-to-end within the positioning device, and a centering area is provided on each end of the receiving channel.

12. The positioning device of claim 1, wherein the centering area of the base member is divided into a pre-centering area and a precision centering area with the precision centering area being between the pre-centering area and a respective end of the receiving channel.

13. The positioning device according to claim 1, wherein at least one of the V-shaped receiving channel, lower sides of the membrane, centering area, pre-centering area and precision centering area are protected from mechanical stress by a wear layer of $SiO_2$.

14. The positioning device of claim 1, wherein the membrane is arranged on a lower side of the retaining member;

the membrane has at least one passage; and a trough-shaped recess to accommodate an index matching fluid is provided in the retaining member above the membrane.

15. The positioning device of claim 1, wherein at least one of the V-shaped receiving channel and the centering area is protected from mechanical stress by a wear layer of $SiO_2$.

16. The positioning device of claim 1, wherein said solid plate is of silicon and said membrane is produced by etching said solid plate.

17. The positioning device of claim 16, wherein said retaining member is made of silicon oriented in a horizontal direction;

a centering area for centering the optical fibers on insertion is provided in said retaining member in front of and/or behind said membrane in the direction of said optical axis; and said centering areas of said retaining member being bordered at each side by walls etched in a directionally selective pattern in the crystal plane.

18. A connector for a detachable connection of two optical fibers, wherein the connector includes a positioning device for automatically positioning and securing at least one optical fiber inserted into said positioning device along a predetermined optical axis;

said positioning device comprising a base member having a flat upper surface and a V-shaped receiving channel which is parallel to said upper surface and is formed in the upper surface to accommodate at least one optical fiber;

said positioning device having a separate spring-action retaining member which is arranged on the supper surface of the base member for securing the minimum of one optical fiber inserted into the receiving channel;

wherein the retaining member comprises a membrane which is arranged above the receiving channel parallel to the upper surface of the base member and is elastically deflectable perpendicular to the upper surface of the base member;

said retaining member being designed as a solid plate of a monocrystalline material, and said membrane is produced in said retaining member by micromechanical processing;

said membrane being deflected upon insertion of at least one optical fiber into the receiving channel;

said membrane having a restoring force as a result of being deflected;

securing at least one optical fiber in the receiving channel with the restoring force.

19. The connector of claim 18, wherein the connector comprises a housing with a device for assembly of the positioning device;

the assembly device has a perpendicular assembly shaft into which the positioning device is inserted and secured there by means of an assembly element;

and the assembly shaft is bordered by transverse walls having insertion bores in a direction of the optical axis; and the optical fibers can be inserted laterally into the assembly shaft or the positioning device through these insertion bores.

20. The connector according to claim 18, wherein the assembly shaft is bordered at a lower side by a V-shaped shaft bottom running parallel to the optical axis;

the positioning device is inserted into the assembly shaft with the base member facing down; and the positioning device is centered by bevels adapted to the V-shaped shaft bottom on the lower side of the base member.

21. The connector of claim 18, wherein a trough-shaped recess to accommodate an index matching fluid is provided in the positioning device above the membrane in the retaining member; and a gasket seal in the form of an O-ring is provided between the assembly member and the retaining member, enclosing and sealing the trough-shaped recess at the top and bottom.

22. The connector of claim 18, wherein said solid plate is silicon and said membrane is produced by etching said solid plate.

23. The connector of claim 22, wherein said retaining member is made of silicon oriented in a horizontal direction;

a centering area for centering the optical fibers on insertion is provided in said retaining member in front of and/or behind said membrane in the direction of said optical axis; and said centering areas of said retaining member being bordered at each side by walls etched in a directionally selective pattern in the crystal plane.

\* \* \* \* \*